A. B. STRANGE.
GATE.
APPLICATION FILED JUNE 14, 1919.
1,324,082.
Patented Dec. 9, 1919.
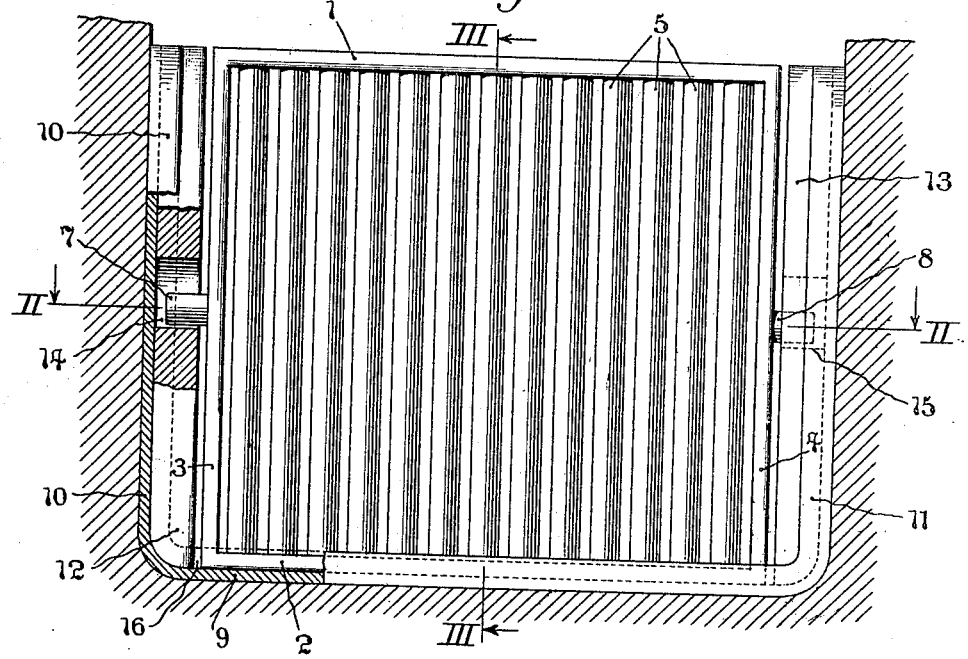
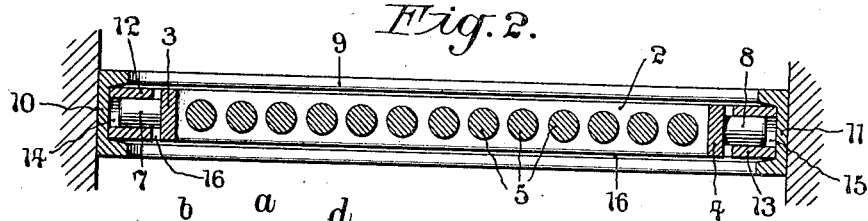
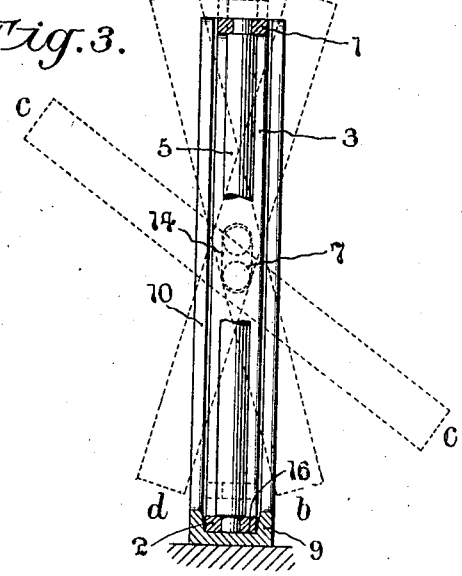
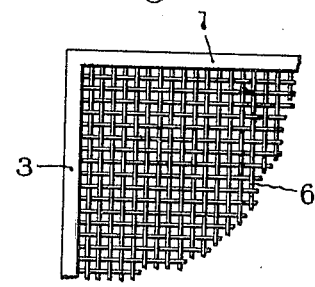
Inventor:
Albert B. Strange
by attorneys

UNITED STATES PATENT OFFICE.

ALBERT B. STRANGE, OF NEW YORK, N. Y.

GATE.

1,324,082.  Specification of Letters Patent.  Patented Dec. 9, 1919.

Application filed June 14, 1919. Serial No. 304,299.

*To all whom it may concern:*

Be it known that I, ALBERT B. STRANGE, a citizen of the United States, and resident of the borough of Manhattan, in the city and State of New York, have invented new and useful Improvements in Gates, of which the following is a specification.

The object of my invention is to provide a novel gate for waterways such for instance as the sluiceways leading to or from a lake or pond, which gate is used for preventing the passage of fish over a certain size therethrough.

My invention comprises a gate of the above character which may be reversed so that any leaves or other foreign matter which have attached themselves to one side of the gate may be washed off therefrom when the gate is reversed.

My invention further comprises certain novel features whereby the gate may be locked in position, yet capable of ready reversal by a combination of vertical and swinging movements with respect to its support.

A practical embodiment of my invention is represented in the accompanying drawings, in which, Figure 1 represents a front elevation of the gate and its support, certain of the parts being broken away.

Fig. 2 represents a horizontal section taken in the plane of the line II—II of Fig. 1.

Fig. 3 represents a vertical section taken in the plane of the line III—III of Fig. 1, different positions of the gate being represented in dotted lines.

Fig. 4 represents a detail front elevation of a slightly modified form of gate.

The top, bottom and sides of the gate are denoted by 1, 2, 3 and 4.

In the form shown in Figs. 1, 2 and 3, inclusive, vertical rollers 5 connect the top and bottom of the gate at short intervals. In the form shown in Fig. 4, wire netting 6 is shown as connecting the top, bottom and sides of the gate. Pins 7 and 8 acting as trunnions project from the sides 3 and 4 of the gate about midway its top and bottom.

The support which I have shown for the gate comprises a U-shaped frame of channel construction, the bottom of the frame being denoted by 9 and the uprising sides by 10 and 11. Filler pieces 12 and 13 are shown located in the uprising portions 10 and 11 of the supporting frame, which pieces are shown as having vertical elongated slots 14, 15, within which the pins 7 and 8 of the gate are located.

The channel 16 in the bottom of the support is arranged to receive and lock the gate against a swinging movement in either direction. The side walls of the channel are preferably made flaring as shown, for guiding the gate into its seat in the bottom of the support.

When it is desired to reverse the gate, it is first elevated vertically out of the channel 16. This position is indicated at $a$ in dotted lines on Fig. 3. The gate is then swung sufficiently to clear the bottom of the support with the trunnion pins raised, as for instance, to the position indicated at $b$ in dotted lines on Fig. 3. The gate may then be dropped as indicated at $c$ in dotted lines on Fig. 3 and swung around until the top of the gate is brought into proximity to the bottom of the support. The gate may then be elevated to the position shown at $d$, Fig. 3. While in this raised position, the gate may be swung to the position indicated at $a$, when it may be again dropped into the channel 16 and locked thereby in its reversed position.

It will thus be seen that a very simple and effective means is provided for clearing the gate of all leaves or foreign matter clinging to one side thereof, the gate being locked against swinging in either direction by its own weight.

It is to be understood that where the waterway is quite broad, the gate may be made in several independently operated sections, if so desired.

The gate support may be seated in or secured to any suitable foundation, of concrete or other material to suit the particular requirements.

It is evident that various changes may be made in the form, construction and operation of the several parts without departing from the spirit and scope of my invention, hence I do not wish to limit myself to the particular construction herein shown and described, but

What I claim is:

1. A suitable support, a reversible gate movable vertically along and pivoted to swing in said support, and means for locking the gate to the support.

2. A suitable support including a bottom having a channel, and a reversible gate seated in said channel and movable vertically along and pivoted to swing in said support, whereby the gate may be lifted out of its channel, reversed and again dropped into the channel.

3. A suitable support including a bottom and sides, said bottom having gate locking means, and a gate having pin and slot connections with the sides about midway between the top and bottom of the gate whereby the gate may be lifted out of its locking means, reversed and again dropped into engagement with its locking means.

4. A suitable support including a bottom and sides, said bottom having a channel, and a gate having pin and slot connections with the sides about midway between the top and bottom of the gate, whereby the gate may be lifted out of the channel, reversed and again dropped into the channel.

5. A suitable support including a bottom and sides, said bottom having a channel, and said sides having vertical slots, and a reversible gate having pins substantially midway between its top and bottom, located in said slots, whereby the gate may be lifted out of the channel, reversed and again dropped into the channel.

In testimony, that I claim the foregoing as my invention, I have signed my name this 30th day of April, 1919.

ALBERT B. STRANGE.